April 3, 1928.                      1,664,692
F. W. LEUTHESSER
COUPLING FOR BATTERY TERMINALS
Filed March 7, 1925
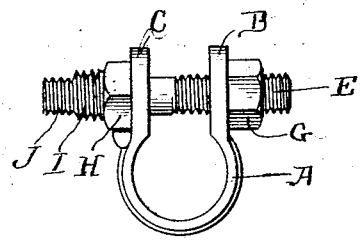
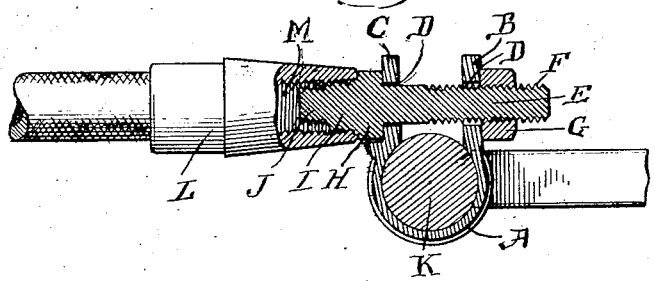
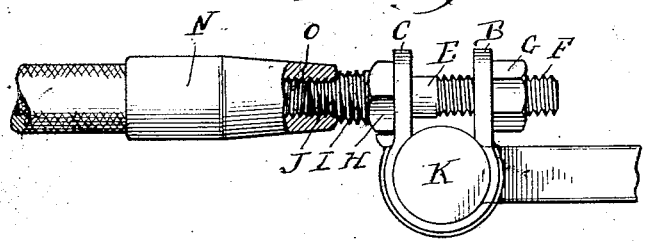
Inventor:
Fred W. Leuthesser
by Domingo Domingo
Atty Patented Apr. 3, 1928.

1,664,692

UNITED STATES PATENT OFFICE.

FRED W. LEUTHESSER, OF OAK PARK, ILLINOIS.

COUPLING FOR BATTERY TERMINALS.

Application filed March 7, 1925. Serial No. 13,689.

The coupling of the present invention is designed for use in connecting the current cables to the terminals of a storage battery, and the object of the invention is to provide a single coupling which is adapted for use in connection with terminals having threaded sockets of either of two standard dimensions, which are in common use in motor car equipment at the present time.

Heretofore it has been customary to provide couplings of two different sizes, each size being adapted only for use in connection with a cable tip of corresponding size, but this practice is often productive of inconvenience or delay, and, of course, requires the keeping of both sizes of couplings in stock at all times. The coupling of the present invention is so designed as to fit either size of cable tip and to connect interchangeably with either, as occasion may require.

In the drawings:

Figure 1 is a side elevation of the coupling of the present invention;

Fig. 2 is a sectional view of the coupling threaded to a cable terminal of larger threaded diameter; and Fig. 3 is a side elevation of the coupling threaded to a terminal of smaller threaded diameter.

The coupling of the present invention comprises a loop A terminating in spaced jaws B and C, each provided with a smooth bore D for the insertion therethrough of a bolt E which is threaded on its free end F to receive a clamping nut G. The bolt is inserted through the bores in the aligned jaws and is provided with a squared head H beyond which are located an inner enlarged threaded nipple I and an outer reduced threaded nipple J, both of the nipples being axially aligned with the axis of the bolt and formed integrally therewith. The clamping loop A is of a size to encircle the upstanding post K of a battery plate, and the two nipples are provided to permit connection either with a cable tip L having a relatively large threaded socket M or a cable tip N having a relatively small threaded socket O.

In use, the bolt will be entered through the jaws of the clamping loop and the nut G threaded on the end of the bolt after which the loop will be positioned to embrace the terminal post K, and the nut threaded down to contract the ends of the jaw to cause the loop to tightly engage the post. This leaves the opposite end of the bolt free to receive either a larger or smaller cable connection as occasion may indicate.

If the larger connection is used, it will be threaded upon the inner larger nipple, the smaller nipple lying within the threaded socket as in Fig. 2, but if a smaller cable connection is used, the parts will be adjusted, as in Fig. 3. The squared head H permits of the use of a wrench or similar tool in threading the appropriate nipple into the socketed tip of the cable if desired, in which case, the clamping nut will be backed away sufficiently to permit the necessary turning of the bolt after which the nut may be threaded back to clamping position.

The invention is one which greatly simplifies the construction and permits the bolts to be manufactured and sold independently of the clamping loops, if desired, and obviates the use of two separately formed nipples which is a less compact and less desirable arrangement than the one here described.

I claim:

A coupling of the character described comprising a clamping loop terminating in spaced jaws provided with alined bores, a bolt entered transversely through the bores in both jaws and projecting at each end from the proximate jaw and threaded on one of its projecting ends, a clamping nut threaded onto said projecting end and bearing against the outer face of the proximate jaw and serving to draw up the clamping loop, and a plurality of threaded nipples of different diameters integrally formed on the opposite projecting end of the bolt in axially alined relation to one another and to the bolt, the outermost nipple being of a smaller diameter than the one next succeeding and the bolt being shouldered behind the nipple to abut against the outer face of the proximate jaw so as to be non-rotatable with respect to said jaw, when in abutting relation, in combination with a cable having on its end an inwardly extending socket threaded to engage with one of the nipples, substantially as described.

FRED W. LEUTHESSER.